US010384695B2

(12) United States Patent
Fenayon et al.

(10) Patent No.: US 10,384,695 B2
(45) Date of Patent: Aug. 20, 2019

(54) RAILCAR ADAPTER FOR CONNECTING A RAILCAR BODY TO A BEARING

(71) Applicants: Ludovic Fenayon, Montbazon (FR); Thierry Le Moigne, Luynes (FR)

(72) Inventors: Ludovic Fenayon, Montbazon (FR); Thierry Le Moigne, Luynes (FR)

(73) Assignee: Aktiebolaget SKF, Göteborg (SE)

( * ) Notice: Subject to any disclaimer, the term of this patent is extended or adjusted under 35 U.S.C. 154(b) by 255 days.

(21) Appl. No.: 15/341,488

(22) Filed: Nov. 2, 2016

(65) Prior Publication Data

US 2017/0137042 A1 May 18, 2017

(30) Foreign Application Priority Data

Nov. 13, 2015 (EP) .................................... 15306798

(51) Int. Cl.
*B61F 15/20* (2006.01)
*B61F 15/06* (2006.01)
*B61F 5/26* (2006.01)
*B61F 5/32* (2006.01)
*F16C 27/06* (2006.01)
*F16C 19/38* (2006.01)

(52) U.S. Cl.
CPC .............. *B61F 15/20* (2013.01); *B61F 5/26* (2013.01); *B61F 5/32* (2013.01); *B61F 15/06* (2013.01); *F16C 27/066* (2013.01); *F16C 19/386* (2013.01); *F16C 2326/10* (2013.01)

(58) Field of Classification Search
CPC .. B61F 15/06; B61F 15/20; B61F 5/26; B61F 5/32; B61F 5/305; B61F 5/125; B61F 5/50; B61F 5/142; B61F 5/308; F16C 19/386; F16C 2326/10; F16C 27/066

USPC ........................................................ 105/199.3
See application file for complete search history.

(56) References Cited

U.S. PATENT DOCUMENTS

| | | | | |
|---|---|---|---|---|
| 3,405,654 A * | 10/1968 | Dilg | .......................... | B61F 5/16 105/189 |
| 4,674,412 A | 6/1987 | Mulcahy et al. | | |
| 5,509,358 A | 4/1996 | Hawthorne et al. | | |
| 5,908,001 A * | 6/1999 | Burke | .................. | B29C 43/006 105/199.4 |
| 6,142,081 A | 11/2000 | Long et al. | | |
| 7,231,878 B2 * | 6/2007 | Wike | ........................ | B61F 5/36 105/218.1 |
| 7,775,163 B2 * | 8/2010 | Forbes | ....................... | B61F 5/30 105/224.1 |
| 2006/0111798 A1 | 5/2006 | Campbell et al. | | |
| 2013/0008338 A1* | 1/2013 | Liu | ......................... | B61F 5/305 105/225 |

(Continued)

FOREIGN PATENT DOCUMENTS

| | | |
|---|---|---|
| WO | 9301962 A1 | 2/1993 |
| WO | 2005005219 A2 | 1/2005 |

*Primary Examiner* — Mark T Le
(74) *Attorney, Agent, or Firm* — Bryan Peckjian; SKF USA Inc. Patent Dept.

(57) ABSTRACT

Railcar adapter, for connecting a railcar body to a bearing, having a bearing seat side secured to the bearing and a frame seat side mounted in a bogie frame of the railcar body is provided. The railcar adapter includes a top cover in contact with the railcar body, forming the frame seat side, a bearing seat adapted to be mounted on the bearing, forming the bearing seat side and at least one damping element located between the top cover and the bearing seat.

17 Claims, 7 Drawing Sheets

(56) References Cited

U.S. PATENT DOCUMENTS

2015/0183442 A1\* 7/2015 Gotlund .................... B61F 5/26
                                                                              105/224.05

\* cited by examiner

RAILCAR ADAPTER FOR CONNECTING A RAILCAR BODY TO A BEARING

CROSS REFERENCE TO RELATED APPLICATIONS

This application claims priority to European patent application no. 15306798.8 filed on Nov. 13, 2015, the contents of which are fully incorporated herein by reference.

FIELD OF THE INVENTION

The present invention relates to the field of bearing adapters for a railcar.

BACKGROUND OF THE INVENTION

A railcar generally provides a pair of side frames on each side having downwardly opening jaws. A bearing adapter is vertically movable within the jaw and rests on a bearing mounted on a railcar axle carrying a wheel of the railcar. Typically, a bearing for a railcar axle fits around a journal at the end of the railcar axle where it is mounted between a backing ring assembly and an end cap.

The railcar adapter acts as a rigid connection between the bogie frame and the railcar axle. Due to limited bearing support surface, the load applied on the bearing by the railcar adapter is not well distributed on the bearing, notably on the rolling elements when the bearing is of the rolling bearing type. This results in wear on the inner surface and the outer surface of the railcar adapter, as well as in failure of the bearing.

BRIEF SUMMARY OF THE INVENTION

Therefore, it is an object of the invention to reduce the load applied from the railcar adapter to the bearing by decoupling the load variation between the railcar axle and the bogie frame.

A solution to reduce those efforts is to provide damping pads in lateral guiding zones between the railcar adapter and the bogie frame. However, such solution is not satisfactory since the damping pads are rapidly deteriorated due to metallic particles between the railcar adapter and the bogie frame.

In one embodiment, a railcar adapter, for connecting a railcar body to a bearing, provides a bearing seat side secured to the bearing and a frame seat side secured to a bogie frame of the railcar body.

The railcar adapter provides a top cover in contact with the railcar body, forming the frame seat side, a bearing seat adapted to be mounted on the bearing, forming the bearing seat side, and at least one damping element located between the top cover and the bearing seat.

The damping element is thus protected from being crushed by the bogie frame in dusty conditions as it is located between the top cover and the bearing seat. Furthermore, both the top cover and the bearing seat can have relative movement, dampened by the damping element. All three parts of the adapter can be changed separately if wear occurs and can be made in different material and with or without heat treatment.

In an embodiment, the bearing seat has an inner surface in radial contact with the bearing and a flat outer surface having a central cutting adapted to receive the damping element and the top cover.

The central cutting is, for example, delimited by two parallel first lateral surfaces perpendicular to a first axis of symmetry of the adapter, parallel to the axis of rotation of the bearing, two opposed first rounded surfaces connecting the first lateral surfaces and a bottom in radial contact with the damping element.

The damping element is, for example, delimited by two parallel second lateral surfaces perpendicular to a first axis of symmetry of the adapter, two opposed second rounded surfaces connecting the second lateral surfaces, a substantially flat inner surface adapted to come in radial contact with the bottom of the bearing seat and a substantially flat outer surface. Each second lateral surface is provided with first cuttings and each second rounded portions being provided with second cuttings.

The top cover is, for example, delimited by two parallel third lateral surfaces perpendicular to the first axis of symmetry of the bearing seat, two opposed third rounded surfaces connecting the third lateral surfaces, a substantially flat inner surface adapted to come in radial contact with the substantially flat outer surface of the damping element and an outer surface adapted to come in radial contact with the railcar body.

Advantageously, the inner surface of the top cover has a plurality of first and second radial portions extending radially inwards and respectively cooperating with the first and second cuttings of the damping element.

In an embodiment, the bearing seat provides two lateral channels each axially delimited by a pair of opposed lugs and a lateral surface perpendicular to the opposed lugs and parallel to the first axis of symmetry of the bearing seat, each lateral channel being adapted to cooperate with the railcar body.

In another embodiment, the bearing seat is a part of a cylinder having an inner cylindrical surface in radial contact with the bearing and an outer cylindrical surface in radial contact with the damping element.

In an embodiment, the damping element has an inner cylindrical surface in radial contact with the outer cylindrical surface of the bearing seat, two axial edges projecting radially inwards, two lateral edges projecting radially inwards and an outer cylindrical surface in radial contact with the top cover. The axial and lateral edges allow the damping of axial and transversal efforts transmitted from the railcar bogie frame.

In an embodiment, the bearing seat provides two transversal projecting portions at each lateral side of the bearing seat, spaced axially by an axial space.

In an embodiment, the damping element provides a radial projecting portion at each lateral side of the damping element, each radial projecting portion being adapted to cooperate with the corresponding axial space of the bearing seat.

In an embodiment, the damping element provides two transversal edges projecting from each axial edge outwardly in the transverse direction, each two transversal edges being adapted to come axially between the corresponding transversal projecting portion of the bearing seat and the top cover. The transversal edges allow the damping of axial efforts transmitted from the railcar bogie frame.

In an embodiment, the top cover has an inner cylindrical surface in radial contact with the damping element, two axial shoulders directed radially inwards and delimiting with the inner cylindrical surface, a housing for the damping element.

Advantageously, the top cover further provides two lateral channels each axially delimited by a pair of opposed lugs and a lateral surface perpendicular to the opposed lugs and parallel to the first axis of symmetry of the adapter, each lateral channel being adapted to cooperate with the railcar body.

The contact surface between the top cover and the railcar body may be spheroidal. Such spheroidal contact surface of the top cover with the bogie frame allows good load transmission to the bearing. As an alternative, the contact surface between the outer surface of the top cover and the railcar bogie frame may have other shapes, such as cylindrical or flat.

The top cover and the bearing seat may be made in rigid material, such as, for example, metal material, such as, for example, casted steel or casted iron. The top cover and the bearing seat can be made from metal by any suitable process, such as, for example, by casting, machining, with or without hardening. The hardening will not impact the bearing seat geometry.

The damping element may be made in soft material, such as, for example, elastomeric material. The damping element acts as a load decoupling means and can be either assembled, overmolded or crimped on the adapter or the cover.

In one embodiment, the railcar adapter provides a connection pin for electrically connecting the top cover and the bearing seat.

The connection pin can be overmolded in the damping element.

According to another aspect, the invention relates to a railcar adapter assembly comprising a railcar adapter as described above, a bearing mounted inside the railcar adapter, a backing ring adapted to come into axial contact with the bearing at a first side, and an end cap assembly adapted to come into axial contact with the bearing at another side, opposite to the first side.

According to another aspect, the invention relates to railcar axle comprising a railcar adapter assembly as described above, a shaft being rotatably mounted about an axis of rotation relative to a railcar adapter, inside the bearing. The shaft provides a first end mounted radially inside the backing ring and a second end, opposite to the first end, secured to the end cap assembly.

BRIEF DESCRIPTION OF THE SEVERAL VIEWS OF THE DRAWING

Other advantages and features of the invention will emerge upon examining the detailed description of embodiments, which are in no way limiting, and the appended drawings wherein.

DETAILED DESCRIPTION OF THE INVENTION

Figure 1:
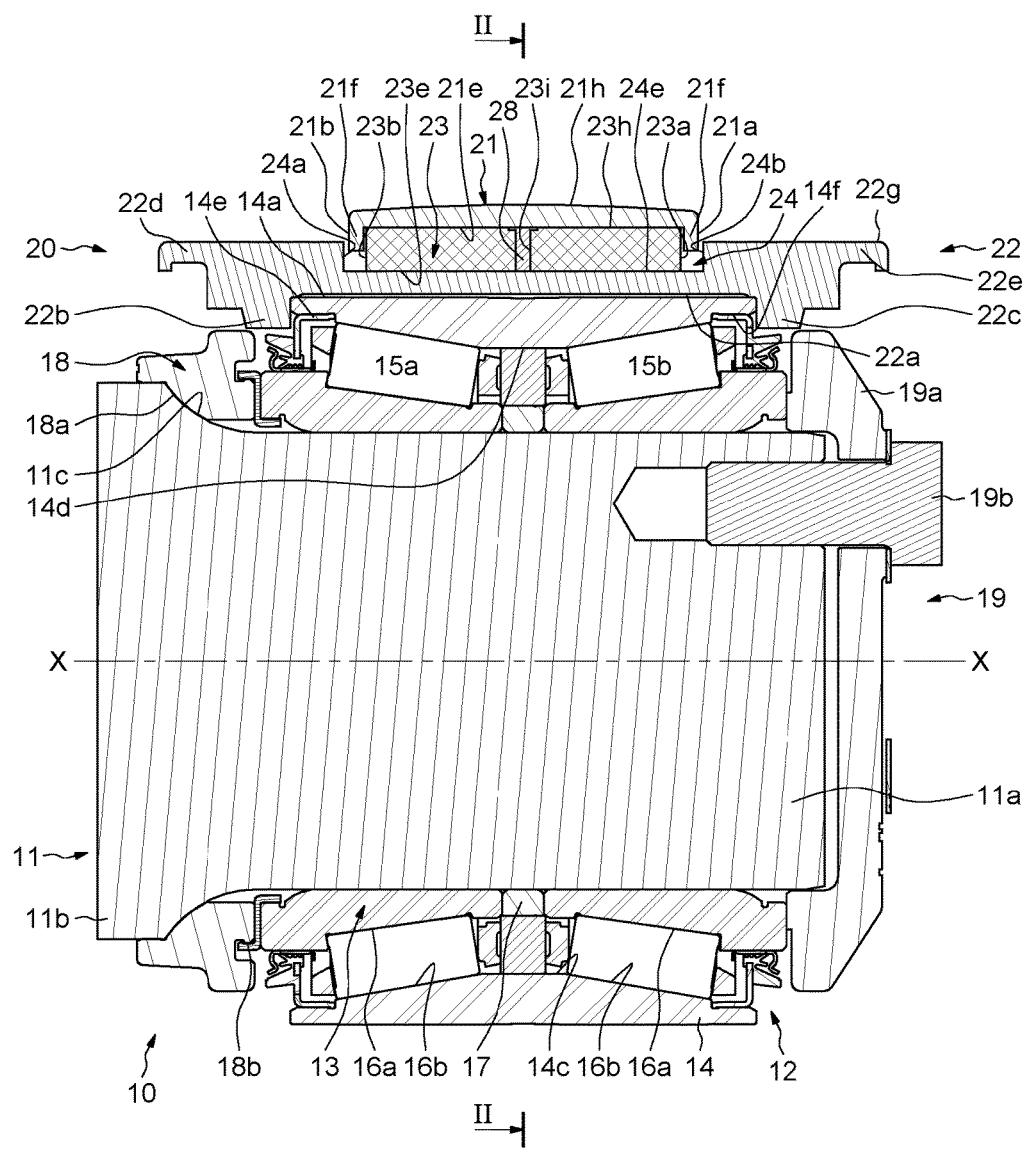
FIG. 1 is an axial cross-section of a railcar axle according to a first embodiment of the invention.
Figure 2:
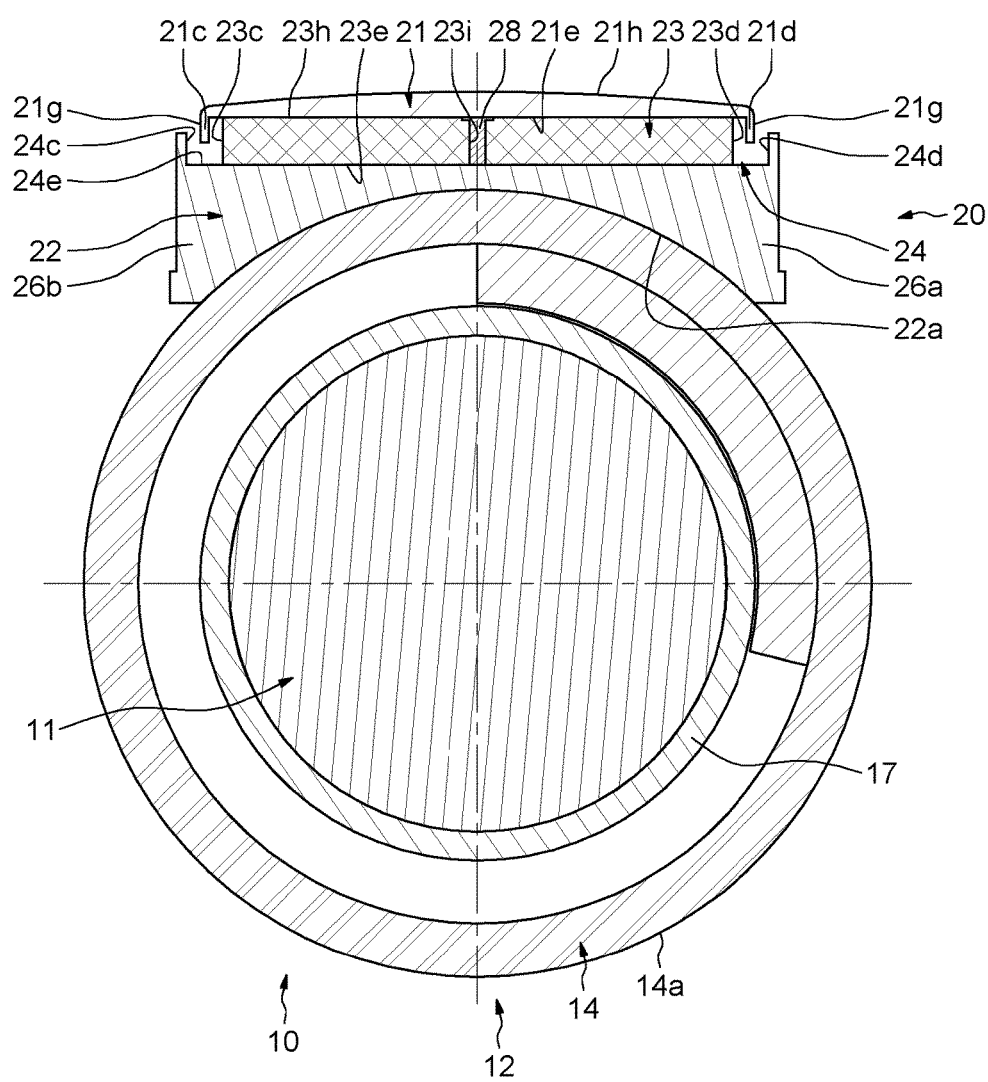
FIG. 2 is a cross-section along axis II-II of FIG. 1.
Figure 3:
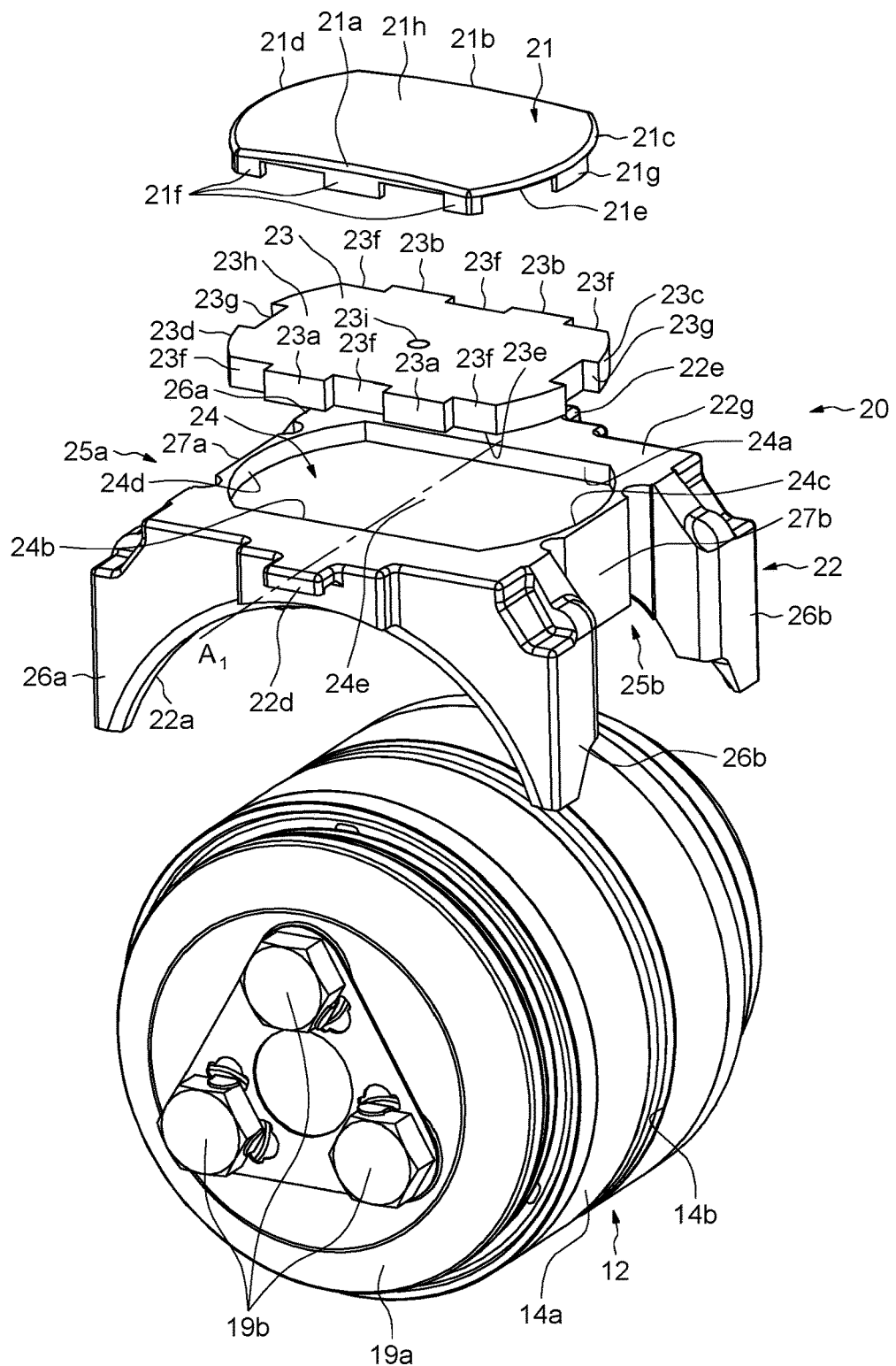
FIG. 3 is a perspective view of the railcar axle of FIG. 1.

Referring to FIGS. 1 to 3, a railcar axle 10 is provided for binding a bogie frame of a railcar (not shown) to the wheels (not shown) of the railcar. The railcar axle 10 provides a shaft 11, being rotatably mounted about an axis of rotation X-X relative to a railcar adapter 20. The railcar adapter 20 is secured to the railcar bogie frame, the shaft 11 being secured to the wheels.

A bearing 12 is radially provided between the railcar adapter 20 and the shaft 11. As illustrated, the bearing 12 is of the rolling bearing type, and provides an inner ring 13 mounted on the shaft 11, an outer ring 14 mounted inside the railcar adapter 20 and two rows of rolling elements 15a, 15b, for example rollers, arranged between tapered raceways 16a, 16b provided on the inner and outer rings 13, 14.

The inner ring 13 is, for example, made in two parts, axially separated by an axial spacer 17. In this embodiment, the bearing 12 is a tapered rollers bearing.

The outer ring 14 provides an outer cylindrical surface 14a provided with a cylindrical groove 14b located on a radial plane of symmetry of the bearing, and an inner surface 14c provided with two tapered surfaces 16b forming the raceways for the rollers 15a, 15b and connected with a central axial surface 14d. Each tapered surface 16b extends axially outwards with a lateral axial surface 14e, 14f.

The shaft 11 provides a journal 11a and a dust guard having a cylindrical surface 11b whose diameter is bigger than the diameter of the journal 11a. A concave fillet 11c connects the cylindrical surface 11b on the journal 11a. The inner ring 13 of the bearing is mounted on the journal 11a.

As illustrated on FIG. 1, the railcar axle 10 further provides a backing ring 18 having an inner surface 18a adapted to radially come into contact with the outer surface of the shaft 11, at the fillet 11c side and to axially come into contact with the inner ring 13 of the bearing 12, through a sealing means 18b. Accordingly, the inner surface 18a has a rounded shape, almost complementary to that of the fillet 11c.

The railcar axle 10 also provides an end cap assembly 19. The end cap assembly 19 includes an end cap 19a provided for being a stop element in case of a leftward translation (relative to FIG. 1) of the shaft 11 relative to the inner ring 13. Therefore, the end cap 19a is reliably secured to the journal 11 by means of three cap screws 19b and comes in axial contact with the inner ring 13 of the bearing 12.

As illustrated in detail on FIGS. 1 to 3, the body of the railcar adapter 20 provides a top cover 21 adapted to come in contact with the bogie frame of the railcar, a bearing seat 22 inside which is mounted the bearing 12 and a damping element 23 mounted between the top cover 21 and the bearing seat 22. The railcar adapter 20 is thus secured to the outer ring 14 by its bearing seat 22 and is mounted inside the bogie frame by its top cover or frame seat 21.

The bearing seat 22 has an inner surface 22a having a concave shape of constant radius so as to sit on the outer cylindrical surface 14a of the outer ring 14 of the bearing 12. The inner surface 22a of the bearing seat 22 is further provided with two axial shoulders 22b, 22c directed radially inwards and delimiting with the concave surface, a housing for the outer ring 14 of the bearing 12. Each axial shoulder 22b, 22c extends axially outwards with a hook portion 22d, 22e adapted to cooperate with the bogie frame of the railcar.

The bearing seat 22 has a flat outer surface 22g having a central cutting 24 delimited by two parallel first lateral surfaces 24a, 24b perpendicular to the axis of rotation X-X of the bearing 12 connected by two opposed first rounded surfaces 24c, 24d. The cutting 24 is adapted to receive the damping element 23 and the top cover 21. As illustrated, the cutting 24 is not made though the thickness of the bearing seat 22 and is provided with a bottom 24e in radial contact with the damping element 23.

As illustrated on FIG. 3, the bearing seat 22 further provides two lateral channels 25a, 25b each axially delimited by a pair of opposed lugs 26a, 26b and a lateral surface 27a, 27b perpendicular to the opposed lugs 26a, 26b. Each lateral channel 25a, 25b has a U-shape and is adapted to engage with a lug of a jaw (not shown) of the bogie frame, so as to act as an insertion guide between the adapter 20 and the bogie frame.

As illustrated, the top cover 21 is delimited by two parallel third lateral surfaces 21a, 21b perpendicular to the axis of rotation X-X of the bearing 12 connected by two opposed third rounded surfaces 21c, 21d. The top cover 21 has a substantially flat inner surface 21e having a plurality of radial portions 21f, 21g extending radially inwards. As an alternative, the inner surface 21e of the top cover 21 may have any other shapes, such as for example a cylindrical shape. As illustrated on FIG. 3, a number of three radial portions 21f are located at the side of each lateral surface 21a, 21b and a number of one radial portion 21g is located at the side of each rounded surface 21c, 21d. As an alternative, the number of those radial portions 21f, 21g may be different.

The top cover 21 further provides an outer surface 21h adapted to come into contact with the bogie frame. As illustrated, the surface of the outer surface 21h of the top cover 21 is spheroidal so that the bogie frame is in contact with a sphere surface of the adapter 20. Such spheroidal contact surface of the top cover with the bogie frame allows good load transmission to the bearing. As an alternative, the contact surface of the outer surface 21h may have other shapes, such as cylindrical or flat.

The bearing seat 22 and the top cover 21 of the railcar adapter 20 are made from metal by any suitable process, such as, for example, by casting, machining, with or without hardening. The hardening will not impact the bearing seat geometry. For example, the bearing seat 22 and the top cover 21 are made from steel or cast iron.

As illustrated, the damping element 23 is delimited by two parallel second lateral surfaces 23a, 23b perpendicular to the axis of rotation X-X of the bearing 12 connected by two opposed second rounded surfaces 23c, 23d. The damping element 23 has a substantially flat inner surface 23e adapted to radially contact the bottom 24e of the bearing seat 22. Each parallel second lateral surfaces 23a, 23b are provided with cuttings 23f adapted to cooperate with the radial portions 21f of the top cover 21 and each rounded portions 23c, 23d are provided with cuttings 23g adapted to cooperate with the radial portions 21g of the top cover 21.

The damping element 23 further provides a substantially flat outer surface 23h adapted to come into radial contact with the inner surface 21e of the top cover 21. As illustrated, the damping element 23 is provided in its center with a through hole 23i for receiving a connecting pin 28 for electrically connecting the top cover 21 and the bearing seat 22. The damping element 23 may be made in soft material, for example elastomeric material. The damping element is protected from being crushed by the bogie frame in dusty conditions as it is located between the top cover 21 and the bearing seat 22. The damping element 23 acts as a load decoupling means between the bogie frame and the bearing and can be either assembled, overmolded or crimped on the bearing seat 22 or the top cover 21.

The connecting pin 28 may be made in metal material. The connecting pin 28 may be overmolded in the damping element 23 for electric current connection between the top cover 21 and the bearing seat 22.

Figure 4:
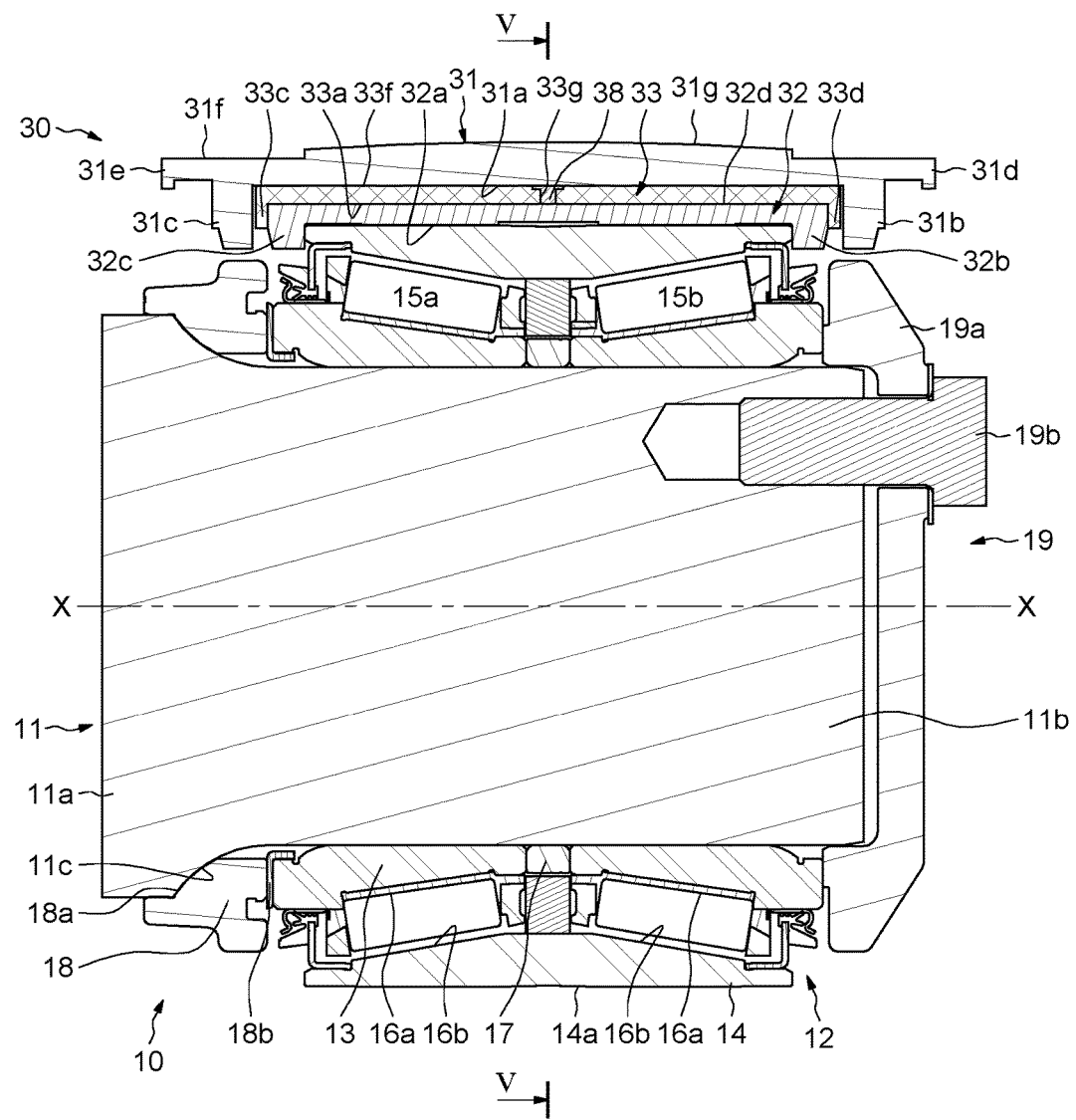
FIG. 4 is an axial cross-section of a railcar axle according to a second embodiment of the invention.
Figure 5:
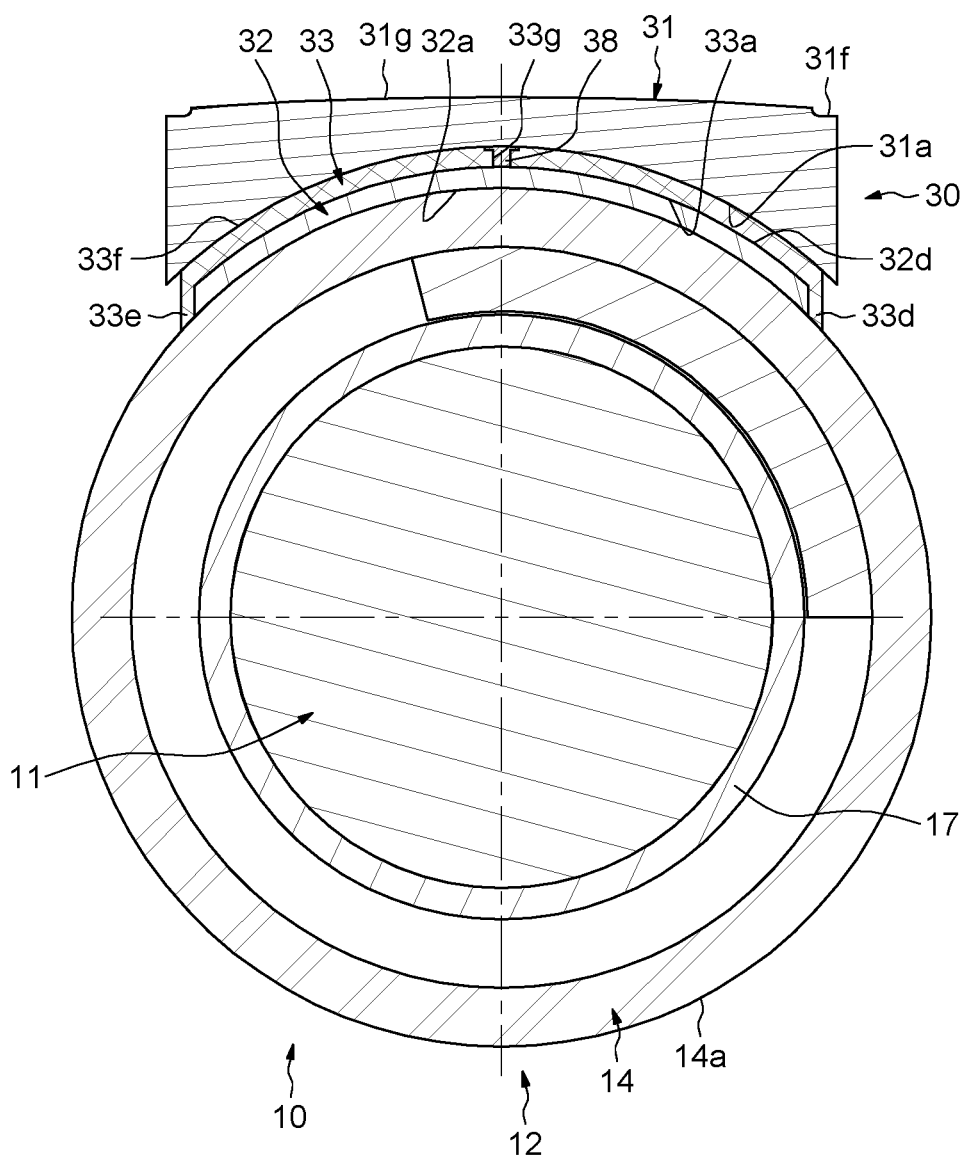
FIG. 5 is a cross-section along axis V-V of FIG. 4.
Figure 6:
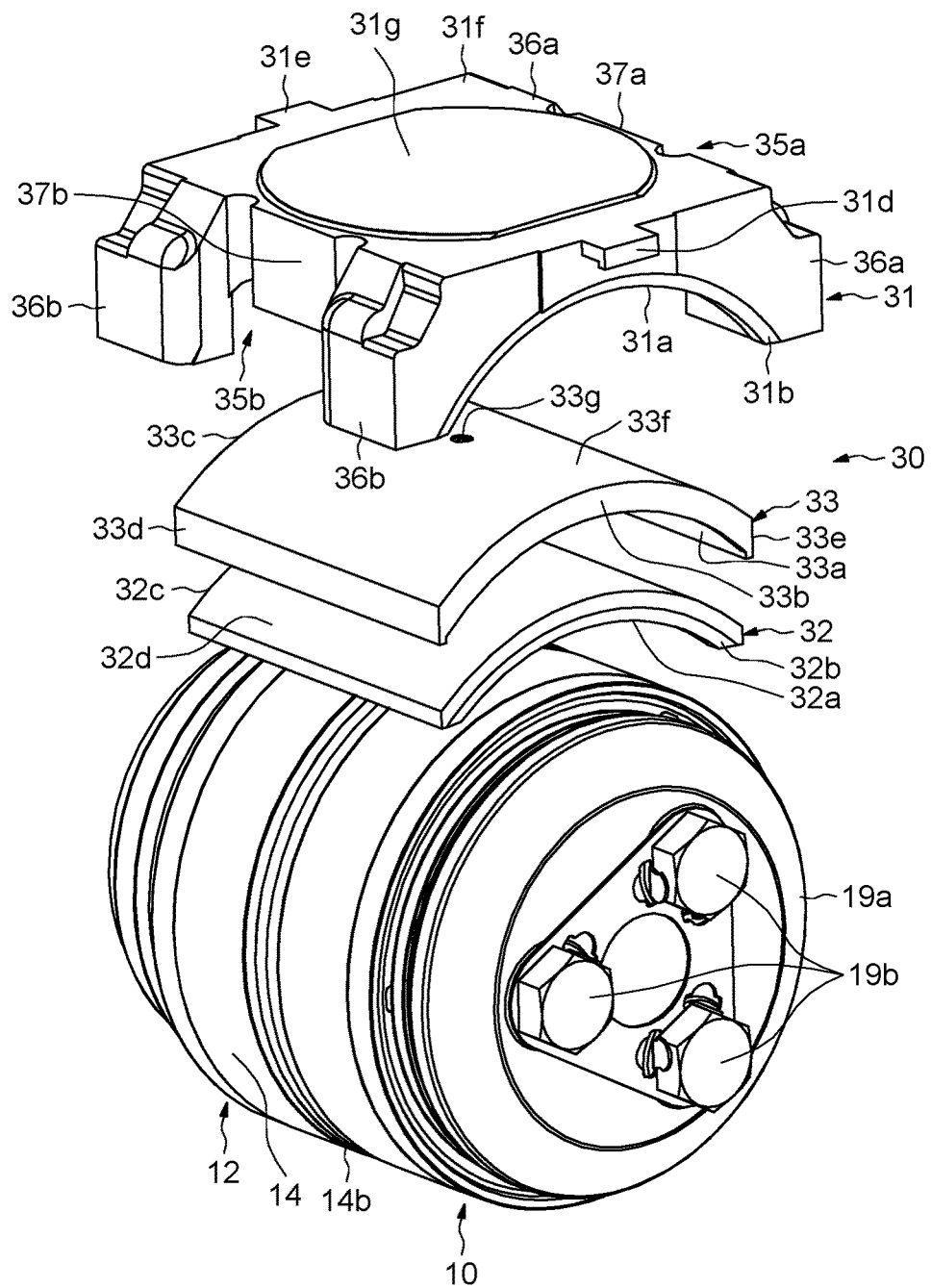
FIG. 6 is a perspective view of the railcar axle of FIG. 4.

The embodiment illustrated on FIGS. 4 to 6, wherein the same elements have the same references, only differs from the embodiment illustrated in FIGS. 1 to 3 by the structure of the railcar adapter.

Referring to FIGS. 4 to 6, the railcar axle 10 provides a shaft 11, being rotatably mounted about an axis of rotation X-X relative to a railcar adapter 30. The railcar adapter 20 is secured to the railcar bogie frame, the shaft 11 being secured to the wheels.

A bearing 12 is radially provided between the railcar adapter 30 and the shaft 11. As illustrated, the bearing 12 is of the rolling bearing type, and provides an inner ring 13 mounted on the shaft 11, an outer ring 14 mounted inside the railcar adapter 30 and two rows of rolling elements 15a, 15b, for example rollers, arranged between tapered raceways 16a, 16b provided on the inner and outer rings 13, 14.

The inner ring 13 is, for example, made in two parts, axially separated by an axial spacer 17. In this embodiment, the bearing 12 is a tapered rollers bearing.

The outer ring 14 provides an outer cylindrical surface 14a provided with a cylindrical groove 14b located on a radial plane of symmetry of the bearing, and an inner surface 14c provided with two tapered surfaces 16b forming the raceways for the rollers 15a, 15b and connected with a central axial surface 14d. Each tapered surface 16b extends axially outwards with a lateral axial surface 14e, 14f.

The shaft 11 provides a journal 11a and a dust guard having a cylindrical surface 11b whose diameter is bigger than the diameter of the journal 11a. A concave fillet 11c connects the cylindrical surface 11b on the journal 11a. The inner ring 13 of the bearing is mounted on the journal 11a.

As illustrated on FIG. 4, the railcar axle 10 further provides a backing ring 18 having an inner surface 18a adapted to radially come into contact with the outer surface of the shaft 11, at the fillet 11c side and to axially come into contact with the inner ring 13 of the bearing 12, through a sealing means 18b. Accordingly, the inner surface 18a has a rounded shape, almost complementary to that of the fillet 11c.

The railcar axle 10 also provides an end cap assembly 19. The end cap assembly 19 includes an end cap 19a provided for being a stop element in case of a leftward translation (relative to FIG. 4) of the shaft 11 relative to the inner ring 13. Therefore, the end cap 19a is reliably secured to the journal 11 by means of three cap screws 19b and comes in axial contact with the inner ring 13 of the bearing 12.

As illustrated in detail on FIGS. 4 to 6, the body of the railcar adapter 30 provides a top cover 31 adapted to come in contact with the bogie frame of the railcar, a bearing seat 32 inside which is mounted the bearing 12 and a damping element 33 mounted between the top cover 31 and the bearing seat 32. The railcar adapter 30 is thus secured to the outer ring 14 by its bearing seat 32 and is mounted inside the bogie frame by its top cover or frame seat 1.

The bearing seat 32 has an inner surface 32a having a concave shape of constant radius so as to sit on the outer cylindrical surface 14a of the outer ring 14 of the bearing 12. The inner surface 32a of the bearing seat 32 is further provided with two axial shoulders 32b, 32c directed radially inwards and delimiting with the concave surface, a housing for the outer ring 14 of the bearing 12. The bearing seat 32 has an outer cylindrical surface 32d having a convex shape of constant radius in radial contact with the damping element 23. The bearing seat 32 can be made as a part of a cylinder.

As illustrated on FIGS. 4 to 6, the damping element 33 has an inner surface 33a having a concave shape of constant radius so as to sit on the outer cylindrical surface 32d of the bearing seat 32, two axial edges 33b, 33c projecting radially inwards and two lateral edges 33d, 33e projecting radially inwards so as to axially and laterally retain the bearing seat 32. The axial and lateral edges 33b, 33c; 33d, 33e allow the damping of axial and transversal efforts transmitted from the railcar bogie frame.

The damping element 33 further provides an outer cylindrical surface 33f having a convex shape of constant radius in radial contact with the top cover 31. The damping element 33 acts as a load decoupling means between the bogie frame and the bearing and can be either assembled, overmolded or crimped on the bearing seat 32 or the top cover 31. The damping element is protected from being crushed by the bogie frame in dusty conditions as it is located between the top cover 31 and the bearing seat 32.

As illustrated on FIGS. 4 to 6, the top cover 31 has an inner surface 31a having a concave shape of constant radius so as to sit on the outer cylindrical surface 33f of the damping element 33. The inner surface 31a of the top cover 31 is further provided with two axial shoulders 31b, 31c directed radially inwards and delimiting with the concave surface, a housing for the damping element 33. Each axial shoulder 31b, 31c extends axially outwards with a hook portion 31d, 31e adapted to cooperate with the bogie frame of the railcar.

The top cover 31 has an outer surface 31f having a spheroidal contact surface 31g with the bogie frame of the railcar. Such of the top cover with the bogie frame allows good load transmission to the bearing. As an alternative, the contact surface with the bogie frame may have other shapes, such as cylindrical or flat.

As illustrated on FIG. 6, the top cover further provides two lateral channels 35a, 35b each axially delimited by a pair of opposed lugs 36a, 36b and a lateral surface 37a, 37b perpendicular to the opposed lugs 36a, 36b. Each lateral channel 35a, 35b has a U-shape and is adapted to engage with a lug of a jaw (not shown) of the bogie frame, so as to act as an insertion guide between the adapter 30 and the bogie frame.

As illustrated, the damping element 33 is provided in its center with a through hole 33g for receiving a connecting pin 38 for electrically connecting the top cover 21 and the bearing seat 22. The damping element 23 may be made in soft material, for example elastomeric material.

The connecting pin 28 may be made in metal material. The connecting pin 28 may be overmolded in the damping element 33 for electric current connection between the top cover 31 and the bearing seat 32.

The bearing seat 32 and the top cover 31 of the railcar adapter 30 are made from metal by any suitable process, such as, for example, by casting, machining, with or without hardening. The hardening will not impact the bearing seat geometry. For example, the bearing seat 32 and the top cover 31 are made from steel or cast iron.

Figure 7:
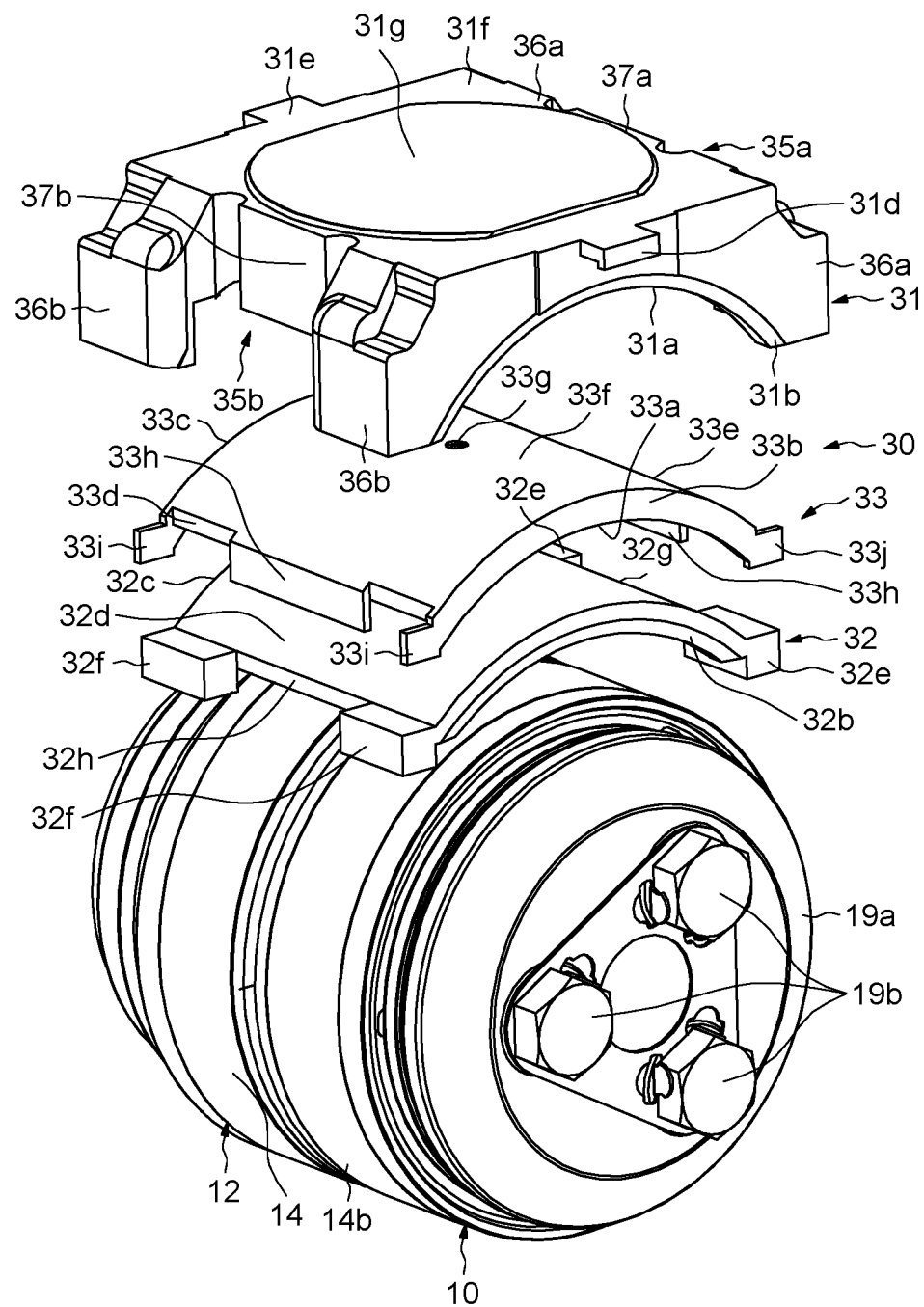
FIG. 7 is a perspective view of the railcar axle according to a third embodiment of the invention.

The embodiment illustrated on FIG. 7, wherein the same elements have the same references, only differs from the embodiment illustrated on FIGS. 4 to 6 by the shape of the damping element 33 and the bearing seat 31 of the railcar adapter 30.

Referring to FIG. 7, the bearing seat 32 has an inner surface 32a having a concave shape of constant radius so as to sit on the outer cylindrical surface 14a of the outer ring 14 of the bearing 12. The inner surface 32a of the bearing seat 32 is further provided with two axial shoulders 32b, 32c directed radially inwards and delimiting with the concave surface, a housing for the outer ring 14 of the bearing 12.

The bearing seat 32 has an outer cylindrical surface 32d having a convex shape of constant radius in radial contact with the damping element 33. The bearing seat 32 can be made as a part of a cylinder.

The bearing seat 32 further provides two transversal projecting portions 32e, 32f at each lateral side of the bearing seat 32, spaced axially by an axial space 32g, 32h.

As illustrated on FIG. 7, the damping element 33 has an inner surface 33a having a concave shape of constant radius so as to sit on the outer cylindrical surface 32d of the bearing seat 32, two axial edges 33b, 33c projecting radially inwards and two lateral edges 33d, 33e projecting radially inwards so as to axially and laterally retain the bearing seat 32. The axial and lateral edges allow the damping of axial and transversal efforts transmitted from the railcar bogie frame.

The damping element 33 further provides an outer cylindrical surface 33f having a convex shape of constant radius in radial contact with the top cover 31. The damping element 33 acts as a load decoupling means between the bogie frame and the bearing and can be either assembled, overmolded or crimped on the bearing seat 32 or the top cover 31. The damping element is protected from being crushed by the bogie frame in dusty conditions as it is located between the top cover 31 and the bearing seat 32.

The damping element further provides a radial projecting portion 33h at each lateral side of the damping element 33. As illustrated, the radial projecting portions 33h are not provided on the whole length of the two lateral edges 33d, 33e. Each radial projecting portion 33h is adapted to cooperate with the corresponding axial space 32g, 32h of the bearing seat 32. The damping element further provides two transversal edges 33i, 33j projecting from the axial edges 33b, 33c outwardly in the transverse direction. The two transversal edges 33i, 33j are adapted to come axially between an axial surface of the corresponding transversal projecting portion 32f, 32e of the bearing seat 32 and the top cover 31.

The top cover 31 illustrated on FIG. 7 is identical to the top cover 31 illustrated on FIGS. 4 to 6 and will not be further described.

It should be noted that the embodiments, illustrated and described were given merely by way of non-limiting indicative examples and that modifications and variations are possible within the scope of the invention.

The invention has been illustrated on the basis of a rolling bearing provided with at least one row of rolling elements radially disposed between the inner and outer rings. Alternatively, the bearing may be a plain bearing or a sliding bearing comprising one or two rings.

The invention claimed is:

1. A railcar adapter, for connecting a railcar body to a bearing, comprising:
   a bearing seat side configured to be secured to the bearing,
   a frame seat side configured to be secured to a bogie frame of the railcar body,
   a top cover configured to contact the railcar body and forming the frame seat side,
   a bearing seat configured to be mounted on the bearing and forming the bearing seat side, and
   at least one damping element located between the top cover and the bearing seat,
   wherein, the bearing seat has an inner surface configured to radially contact the bearing and a flat outer surface having a central cutting, the at least one damping element and the top cover extending into the cutting, and wherein the central cutting is delimited by two parallel first lateral surfaces perpendicular to a first axis of symmetry of the adapter, two opposed first rounded surfaces connecting the first lateral surfaces, and a bottom in radial contact with the at least one damping element, and wherein the at least one damping element is delimited by two parallel second lateral surfaces perpendicular to the first axis of symmetry of the adapter, two opposed second rounded surfaces connecting the second lateral surfaces, a substantially flat inner surface in radial contact with the bearing seat and a substantially flat outer surface, each second lateral surface being provided with first cuttings and each second rounded portions being provided with second cuttings.

2. The railcar adapter according to claim 1, wherein a portion of an upper surface of the top cover configured to form a contact surface between the top cover and the railcar body is spheroidal.

3. The railcar adapter according to claim 1, wherein the top cover and the bearing seat are made in rigid material.

4. The railcar adapter according to claim 1, wherein the at least one damping element is made of a soft material.

5. The railcar adapter according to claim 1, further comprising a connection pin electrically connecting the top cover and the bearing seat.

6. The railcar adapter according to claim 5, wherein the connection pin is overmolded in the at least one damping element.

7. The railcar adapted according to claim 1, wherein the at least one damping element comprises an elastomeric pad.

8. A railcar adapter, for connecting a railcar body to a bearing, comprising:
a bearing seat side configured to be secured to the bearing,
a frame seat side configured to be secured to a bogie frame of the railcar body,
a top cover configured to contact the railcar body and forming the frame seat side,
a bearing seat configured to be mounted on the bearing and forming the bearing seat side, and
at least one damping element located between the top cover and the bearing seat,
wherein the bearing seat has an inner surface configured to radially contact the bearing and a flat outer surface having a central cutting, the at least one damping element and the top cover extending into the cutting, and
wherein the bearing seat comprises two lateral channels each axially delimited by a pair of opposed lugs and a lateral surface perpendicular to the opposed lugs and parallel to a first axis of symmetry of the bearing seat, each lateral channel being adapted to cooperate with the railcar body.

9. The railcar adapter according to claim 8, wherein
the central cutting is delimited by two parallel first lateral surfaces perpendicular to a first axis of symmetry of the adapter, two opposed first rounded surfaces connecting the first lateral surfaces, and a bottom in radial contact with the at least one damping element, and wherein the at least one damping element is delimited by two parallel second lateral surfaces perpendicular to the first axis of symmetry of the adapter, two opposed second rounded surfaces connecting the second lateral surfaces, a substantially flat inner surface in radial contact with the bearing seat and a substantially flat outer surface, each second lateral surface being provided with first cuttings and each second rounded portions being provided with second cuttings.

10. The railcar adapter according to claim 9, wherein the top cover is delimited by two parallel third lateral surfaces perpendicular to the first axis of symmetry of the bearing seat, two opposed third rounded surfaces connecting the third lateral surfaces, a substantially flat inner surface in radial contact with the substantially flat outer surface of the at least one damping element and an outer surface configured to contact the railcar body, the substantially flat inner surface of the top cover having a plurality of first and second radial portions extending radially inwards and respectively cooperating with the first and second cuttings of the at least one damping element.

11. The railcar adapted according to claim 8, wherein the at least one damping element comprises an elastomeric pad.

12. A railcar adapter, for connecting a railcar body to a bearing, comprising:
a bearing seat side configured to be secured to the bearing,
a frame seat side configured to be secured to a bogie frame of the railcar body,
a top cover including radial portions extending toward the bearing and configured to contact the railcar body and forming the frame seat side,
a bearing seat configured to be mounted on the bearing and forming the bearing seat side, and
at least one damping element located between the top cover and the bearing seat,
wherein the bearing seat has an inner surface configured to radially contact the bearing and an outer surface having a central cutting, the central cutting having a bottom, the at least one damping element being located in the cutting and located entirely radially outward of the bottom of the cutting, and
wherein the bearing seat comprises two lateral channels each axially delimited by a pair of opposed lugs and a lateral surface perpendicular to the opposed lugs and parallel to a first axis of symmetry of the bearing seat, each lateral channel being adapted to cooperate with the railcar body.

13. A railcar adapter assembly comprising:
a bearing,
the railcar adapter according to claim 12 having the bearing seat side secured to the bearing,
a backing ring axially contacting a first side of the bearing, and
an end cap assembly axially contacting the bearing at a second side, opposite to the first side.

14. The railcar adapter according to claim 12, wherein the bottom of the central cutting is substantially flat.

15. The railcar adapter according to claim 12, wherein the at least one damping element projects radially outward from the central cutting.

16. The railcar adapter according to claim 12, wherein at least a portion of the top cover extends into the central cutting.

17. The railcar adapter according to claim 12,
wherein the central cutting is delimited by two parallel first lateral surfaces perpendicular to a first axis of symmetry of the adapter, two opposed first rounded surfaces connecting the first lateral surfaces, and a bottom in radial contact with the at least one damping element, and
wherein the at least one damping element is delimited by two parallel second lateral surfaces perpendicular to the first axis of symmetry of the adapter, two opposed second rounded surfaces connecting the second lateral surfaces, a substantially flat inner surface in radial contact with the bottom of the central cutting and a substantially flat outer surface, each second lateral surface being provided with first cuttings and each second rounded portions being provided with second cuttings.

\* \* \* \* \*